United States Patent [19]
Buckley et al.

[11] 3,727,075
[45] Apr. 10, 1973

[54] MISSING TYPE DETECTOR

[75] Inventors: Frederick Buckley, Vestal; George Melnyk; Bruce A. Wolfe, both of Endicott, all of N.Y.

[73] Assignee: International Business Machines Corporation, Armonk, N.Y.

[22] Filed: Feb. 24, 1972

[21] Appl. No.: 228,979

[52] U.S. Cl. ..............307/149, 317/DIG. 2, 331/65
[51] Int. Cl. ..................................G01n 27/00, H02j
[58] Field of Search..................317/DIG. 2; 331/65; 324/40, 41; 307/149

[56] References Cited

UNITED STATES PATENTS

| | | | |
|---|---|---|---|
| 1,640,524 | 8/1927 | Augustine | 192/125 |
| 2,255,053 | 9/1941 | Gunn | 324/40 |
| 2,477,057 | 7/1949 | Grady, Jr. | 324/41 |
| 2,550,736 | 5/1951 | Tricebock | 324/41 |
| 2,580,670 | 1/1952 | Gilbert | 324/41 |
| 2,706,800 | 4/1955 | Bubb, Jr. | 324/41 |
| 2,711,510 | 6/1955 | Tricebock | 324/41 |
| 3,061,775 | 10/1962 | Reznowski | 324/40 |
| 3,314,006 | 4/1967 | Hentschel | 324/41 |
| 3,344,346 | 9/1967 | Halsey | 324/40 |
| 3,416,071 | 12/1968 | Wiers | 324/40 |
| 3,449,661 | 6/1969 | Puidak | 324/34 |
| 3,453,532 | 7/1969 | Gardiner | 324/3 |
| 3,469,204 | 9/1969 | Magyar et al. | 317/DIG. 2 |
| 3,489,955 | 1/1970 | Freeborn | 317/123 |
| 3,521,184 | 7/1970 | Bowker | 331/65 |
| 3,601,691 | 8/1971 | Gardiner | 324/43 |
| 3,603,874 | 9/1971 | Posey | 324/40 |
| 3,605,610 | 9/1971 | McDowell et al. | 101/93 |
| 3,626,344 | 12/1971 | Shaternikov et al. | 336/13 |

Primary Examiner—L. T. Nix
Attorney—Norman R. Bardales et al.

[57] ABSTRACT

A moving train of type elements associated with a high speed printer are passed through the gap of an inductor. The inductor, which is part of a tank circuit of an oscillator, provides a magnetic field across the gap which induces eddy currents in the type elements. The oscillator provides an output signal which is responsive to the changes in the effective resistance of the inductor caused by changes in the eddy currents whenever at least a predetermined portion of at least one of the type elements is missing.

7 Claims, 4 Drawing Figures

MISSING TYPE DETECTOR

CROSS-REFERENCE OF RELATED APPLICATIONS

This invention is particularly useful for high speed printers such as the one described in co-pending patent application, Ser. No. 884,953, filed Dec. 15, 1969, entitled "High Speed Front Printer", James M. Cunningham and assigned to the present assignee herein, and now U.S. Pat. No. 3,653,321, patented Apr. 4, 1942. The aforementioned co-pending application is incorporated by reference herein.

BACKGROUND OF THE INVENTION

1. Field of the Invention

This invention is related to missing type detectors for printers and is particularly useful for high speed printers.

2. Description of the Prior Art

If in a printer a missing type is undetected, a gap in the printout results. Heretofore in the low speed printers of the prior art which employed movable type, detection of a missing type was accomplished through visual observance by the operator. This prior art technique for detecting missing type was not very reliable or satisfactory since it was subject to human error.

With the advent of high speed printers, the detection of missing type became even more acute. For example, a broken piece of type, if not detected, besides causing a gap in the printout, could cause serious physical damage to the printer apparatus and/or operator especially if it were to be propelled by coming into contact with some high speed moving part of the printer. Thus, the reliance upon a human observer to detect for a missing type was not only unreliable but impractical in the case of high speed printers.

The use of an automatic detector system is thus dictated. While an automatic optical detector system is suggested, it has certain disadvantages. For example, the optical detectors are subject to external and hence erroneous stimulation such as light leakage, or degradation as might be the case of dirt and dust type particles from the paper being printed on and generally associated with the printer environment. Thus, automatic optical detectors are also not deemed practical for this purpose.

SUMMARY OF THE INVENTION

It is an object of this invention to provide a simple and automatic missing type detector circuit apparatus for a movable type printer, and which is particularly useful for high speed printers.

Another object of the invention is to provide the aforementioned detector circuit apparatus which is impervious to external stimulation caused by dirt, dust, electrical noise, stray magnetic fields and the like.

According to one aspect of the invention, there is provided in a moving type printer having a train of type elements moving in a predetermined path, a missing type detector circuit apparatus. The missing type detector circuit apparatus has oscillator circuit means and output signal means. The oscillator circuit means has tank circuit means which has inductor means with a gap through which the moving type elements pass. The inductor means provides a magnetic field in the gap for inducing eddy currents in the moving type elements. The output signal means is responsive to changes in the effective resistance of the inductor means caused by the changes in the eddy currents induced in the type elements whenever at least a predetermined portion of at least one of the type elements is missing.

As contemplated by the present invention, a change in the effective resistance component of the inductor is utilized rather than a change of its reactive component, thereby simplifying the attendant problems associated with the requirements for sensing a change in the reactive component.

The foregoing and other objects, features and advantages of the invention will be apparent from the following more particular description of preferred embodiments of the invention, as illustrated in the accompanying drawing.

BRIEF DESCRIPTION OF THE DRAWING

In the figures, like elements are designated with similar reference characters.

DESCRIPTION OF THE PREFERRED EMBODIMENTS

For sake of explanation, it will be assumed that the missing type detector circuit apparatus of the inventive embodiments described herein are part of high speed front printers such as the one described in the aforementioned co-pending application, Ser. No. 884,953. Briefly, in the high speed front printer described in the last-mentioned application, a plurality or train of type carriers are guided along a print line by a continuous guide rail. Each type carrier has a plurality of pivotal levers carrying raised type characters adjacent their free ends. The type carrier levers are impacted by selected type hammers in the different print positions to impact a document and a ribbon or the like for printing in selected positions as the type carriers move by the print positions. For a more detailed description of the apparatus and operation of this high speed front printer, reference can be made to the aforementioned co-pending application, Ser. No. 884,953, which as aforementioned is incorporated by reference herein.

Figure 1:
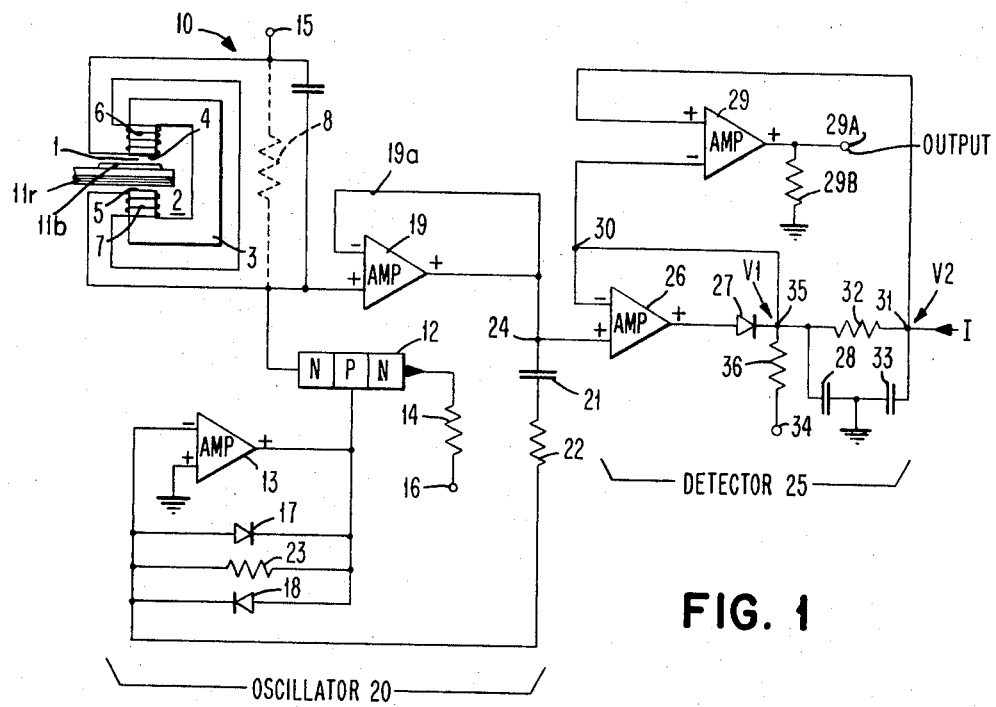
FIG. 1 is a schematic diagram in partial block form of an embodiment of the circuit apparatus of the present invention.

Referring now to FIG. 1, for sake of clarity only a part of one type element is shown. More specifically, the part of the type element which is illustrated in partially broken away form in FIG. 1 is the raised type character 11b and cam surface 11r, which are described and referred to in the aforesaid co-pending application and designated therein with the same reference characteristics 11b and 11r. It should be understood, that there is a plurality or train of such type elements and that in operation the type elements move in a path which is normal to the plane of FIG. 1.

In accordance with the principles of the present invention, the train of moving type elements are passed through the gap 1 of a suitable inductor 2. Inductor 2 provides an alternating magnetic field in gap 1. Preferably, inductor 2 is of the type comprising a ferrite core 3 with opposing pole faces 4, 5, which define gap 1. It also includes a pair of windings 6, 7, which are wound on core 3 in a series aiding relationship.

If all the type elements are present, a certain level of eddy currents are induced in the moving type elements which tend to counteract or oppose the changes in the magnetic field in gap 1 than would ordinarily be the case if gap 1 was empty. Accordingly, as some predetermined portion of one or more of the type elements becomes missing the magnetic field strength in the gap increases due to the decrease in the eddy current level resulting from the diminution of the physical amount of type element(s) passing through the gap. As is explained hereinafter, the effective shunt resistance of the inductor 2 is inversely proportional to the level of the eddy currents induced in the type elements passing through gap 1. The present invention utilizes the resultant change in the effective shunt resistance 8, shown in dash line form in FIG. 1 for sake of explanation, caused by the change in the level of the eddy current when one or more type elements or predetermined portion thereof becomes missing.

More particularly, the latter is effected by combining the inductor 2 with condenser 9 to form a tank circuit 10. The tank circuit 10 in turn is preferably part of the positive feedback path of an oscillator 20 and determines the oscillator's amplitude and frequency of oscillation. Oscillator 20 which is generally indicated by the legend OSCILLATOR in FIG. 1, includes a current amplifier 12 and gain and limiting amplifier 13. Current amplifier 12, which is configured as an NPN transistorized type, drives tank circuit 10. Its collector is connected to one end of the tank circuit 10. Its emitter is connected to a bias resistor 14. Suitable power supply means, not shown, are connected to the terminals 15 and 16.

Amplifier 13 is preferably configured as a differential amplifier. Its noninverted input is grounded as shown in FIG. 1. The loop gain of the oscillator is limited by the parallel connected back-to-back diodes 17, 18, connected across the output of amplifier 13 and its inverted input. The output of amplifier 13 is also connected to the control or base electrode of current amplifier 12. The loop gain control is such that the signal current driving tank circuit 10 is substantially constant in amplitude and is periodically provided at the tank circuit's resonance frequency. Consequently, the amplitude of the sinusoidal voltage across tank circuit 10 is proportional to the effective resistance 8. It is preferable to provide a buffer amplifier 19 in the feedback path of the oscillator to minimize loading of the tank circuit 10. In the embodiment of FIG. 1, amplifier 19 is configured as a differential amplifier with an appropriate feedback loop shown schematically as a conductor 19a connected across its output to its inverting input. The output signal of amplifier 19 is a.c. coupled via capacitor 21 and resistor 22 to the inverting input of amplifier 13. At resonance, the loop gain for small signals is approximately the product of resistors 8 and 23 divided by the product of resistors 14 and 22. An output is taken from the oscillator at node 24.

Figure 2:
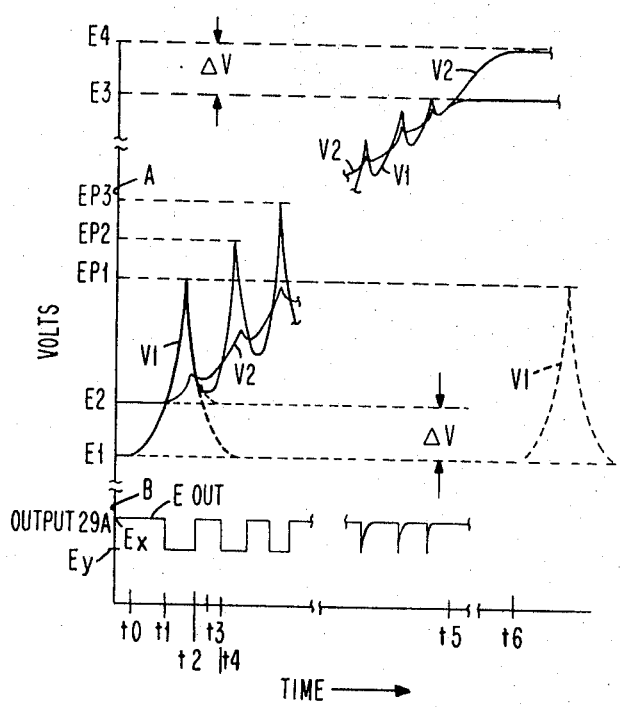
FIG. 2 is an idealized waveform diagram associated with the circuit apparatus of FIG. 1.

Node 24 is connected to a suitable signal detector circuit 25. Preferably, the output signal at node 24 is fed to the input of a positive peak follower, which in the embodiment of FIG. 2 is generally shown as the network of amplifier 26, clipping diode 27, capacitor 28 and resistor 36. Amplifier 26 is preferably configured as a differential amplifier and its noninverted input is connected to node 24. The peak follower extracts the positive sinusoidal envelope of the oscillator output signal and provides an analog voltage V1 at node 35 which is proportional to the resistance 8. The voltage V1 is fed back to the inverted input of amplifier 26, as well as to an input of a comparator 29. Comparator 29 as configured in FIG. 1 also is a differential amplifier and its inverted input is connected to node 30 and hence node 35. The non-inverted input of comparator 29 is connected to node 31. The output of comparator 29 is taken at terminal 29A across grounded resistor 29B. Also connected to node 31 is a constant current source, not shown, which provides a reference voltage V2-V1 across nodes 31 and 35. In this regard, the RC integrator 32-33, in connection with the current source, not shown, provides a reference voltage V2 at node 31, which is compared with the voltage V1 by comparator 29. A suitable reference supply, not shown, is connected to terminal 34 which is connected to node 35 via resistor 36.

The operation of the circuit of FIG. 1 will now be described. For the above-described loop gain condition, i.e. a small signal condition, as the voltage at the output or node 24 of the oscillator increases, it causes a corresponding increase in the current passing through resistor 22. The increasing current, which is fed to the inverting input of amplifier 13, thereby decreases the output voltage of amplifier 13. In turn, this voltage decrease at the output of amplifier 13, which is applied to the base of transistorized amplifier 12, causes a decrease in the emitter voltage of amplifier 12. As a result, the collector current of amplifier 12, which current drives tank circuit 10, decreases and thereby causes a reduction of the voltage across the tank circuit 10 resulting in the voltage increasing at node 24. The now increasing voltage at node 24 causes a corresponding decrease in the current passing through resistor 22 thereby increasing the output voltage of amplifier 13. As a result, the collector current of amplifier 12 increases and the output voltage of the circuit 10 and resulting voltage at node 24 decrease and the cycle repeats.

The collector current which drives the tank circuit 10 causes the latter to ring or oscillate in a manner well known to those skilled in the art at its resonant frequency and as a consequence, the voltage across the tank, and hence at node 24, is substantially sinusoidal. However, while the collector current is varying periodically, its effective value is substantially constant. Thus, the amplitude of the sinusoidal voltage across tank circuit 10 is proportional to the effective resistance 8. Consequently, any increase in the effective resistance 8, which is caused by one or more missing type elements or predetermined portion thereof and concomitant reduction of eddy currents induced in the remaining type elements, will cause an increase in the IR drop across resistance 8 and hence in the respective amplitudes of the output signals of tank circuit 10 and at node 24. As is obvious to those skilled in the art, the sinusoidal voltage at node 24 is converted by the coaction of amplifier 13 and diodes 17, 18 to a square wave pulse train of the frequency of the sinusoidal voltage. The square wave voltage train, in turn, causes the current source, i.e. transistor 12, to change at the same frequency between two conduction levels.

The sinusoidal output at node 24 is fed to the aforementioned peak follower network of detector 25 which provides the extracted envelope signal V1 at node 35. Referring to FIG. 2, for sake of explanation it will be assumed that prior to time $t0$ all the type elements of the type train are present and passing through gap 1, and that thereafter every other type element in the train just prior to passing through gap 1 is missing, e.g. becomes broken off.

Accordingly, just prior to time $t0$, the voltage V1 will be at a quiescent level E1, c.f. axis A of FIG. 2, which is associated with the condition of all type elements being present and passing through gap 1. More particularly under this condition, the eddy currents induced in the type elements are at some maximum level and the inversely proportional resistance 8 is at some corresponding low value. The amplitudes of the resultant sinusoidal IR drop across tank circuit 10 and sinusoidal output at node 24 are hence at their correspondingly lowest values. Thus, when the peak follower extracts the envelope wave shape of the sinusoidal signal appearing at node 24, its output signal V1 will be at the lower level E1 shown in FIG. 2. Under this same condition, the constant current source, not shown, connected to node 31 provides an IR drop across resistor 32 which maintains the voltage V2 present at node 31 at some higher quiescent level E2, the drop $\Delta V$ across resistor 32 being substantially constant. As a result, the output signal Eout, c.f. axis B of FIG. 2, at output 29A of comparator 29 is at a null, e.g. level Ex shown in FIG. 2.

At $t0$, the portion of the type train with the first missing type element begins to pass through gap 1. For sake of clarity, the first missing type element of the train is indicated by the dash line 110, c.f. axis C. It should be understood that the vertical dash lines associated with the waveform of axis C represent the alternate missing type elements, the vertical solid lines represent the remaining type elements, and the arrow D indicates their direction of their movement. The void in the train caused by the missing type element causes the eddy current level induced in the remaining type elements to decrease. This decrease results in the effective resistance 8 increasing and the amplitudes of the output signals across the tank circuit 10 and node 24 to increase. As a result, signal V1 at node 35 begins to rise at time $t0$ due to the increase in amplitude of the signal at node 24. Signal V2 also begins to rise at time $t0$ but at a slower rate than V1, the capacitance of capacitor 33 being judiciously selected to be larger than that of capacitor 28 for this purpose.

At $t1$, signal V1 crosses over signal V2, i.e. V1 becomes larger than V2. Signal Eout in response to the crossover goes from its null level Ex to a different level Ey, which change is indicative of the presence of a missing type condition. In practice and preferably, when such a condition occurs the change in signal levels of signal Eout would be fed to a control system, not shown, which stops the movement of the type train and/or other moving parts of the printer. For example, the output 29A may be coupled to a latch circuit which is triggered and set to its latched state by the aforesaid change in the signal level of signal Eout at time $t1$.

However, for sake of explanation, it will be assumed that the type train does not stop at time t1. Accordingly, the change in the eddy current level induced in the remaining type causes signal V1 to reach some level EP1 whereupon the signal V1 attempts to return to its quiescent level E1 as the void created by the missing type element becomes more and more removed from gap 1. At time $t2$, signal V1 once again goes below signal V2, and the output signal Eout returns to its null level Ex. If no other type were missing, the signals V1 and V2 would return to their respective quiescent levels E1 and E2, and the cycle would not repeat until the next time, e.g. time $t6$, when the void created by the particular missing type elements again commences to pass through gap 1.

For the assumed condition of alternately missing type elements and nonstoppage of the type train, at time $t3$ the void created by the next missing type element 112 in the train commences to pass through gap 1. As a result, signals V1 and V2 begin to rise and at time t4 signal V1 crosses over signal V2. Signal Eout of comparator 29 again switches from level Ex to level Ey. After the signal V1 reaches its peak EP2, it again proceeds to descend toward its quiescent level E1. When signal V1 goes below signal V2 at time $t4$, signal Eout reverts back to its null level Ex.

Each successive missing type void continues the cycle. The signal levels E3 and E4 represent the levels of signals V1 and V2, respectively, if no type elements are in gap 1 such as might be the case when the type train is removed for some purpose, e.g. maintenance, replacement, cleaning, etc. Consequently, for the assumed case where all the type elements become alternately missing just prior to passing through gap 1 and the type train continues to move, then eventually at time $t5$ when some subsequential part of or all of the type voids have gone through gap 1 signals V1 and V2 will become asymptotic to the respective levels E3 and E4 and the output level of comparator 29 would remain at Ex. In the assumed condition, it should be noted that the pulse widths of signal Eout become progressively smaller.

It should be understood that if the spacing between the voids formed by the missing type elements in the train is large enough, the signals V1 and V2 would return to their respective quiescent levels E1 and E2 between peaks. In general, as can be readily appreciated by those familiar with the art, the waveform characteristics shown in FIG. 2 will be a function of the number of and spacing between type elements, the length and speed of the train, the number of and spacing between voids, the dimension of the void(s), and the time constants associated with the integrator 32, 33 and peak follower.

As previously mentioned, however, as contemplated by the preferred mode of operation, the type train and/or other moving parts of the printer would be stopped as soon as the first change in the signal level of signal Eout occurs.

Figure 3:
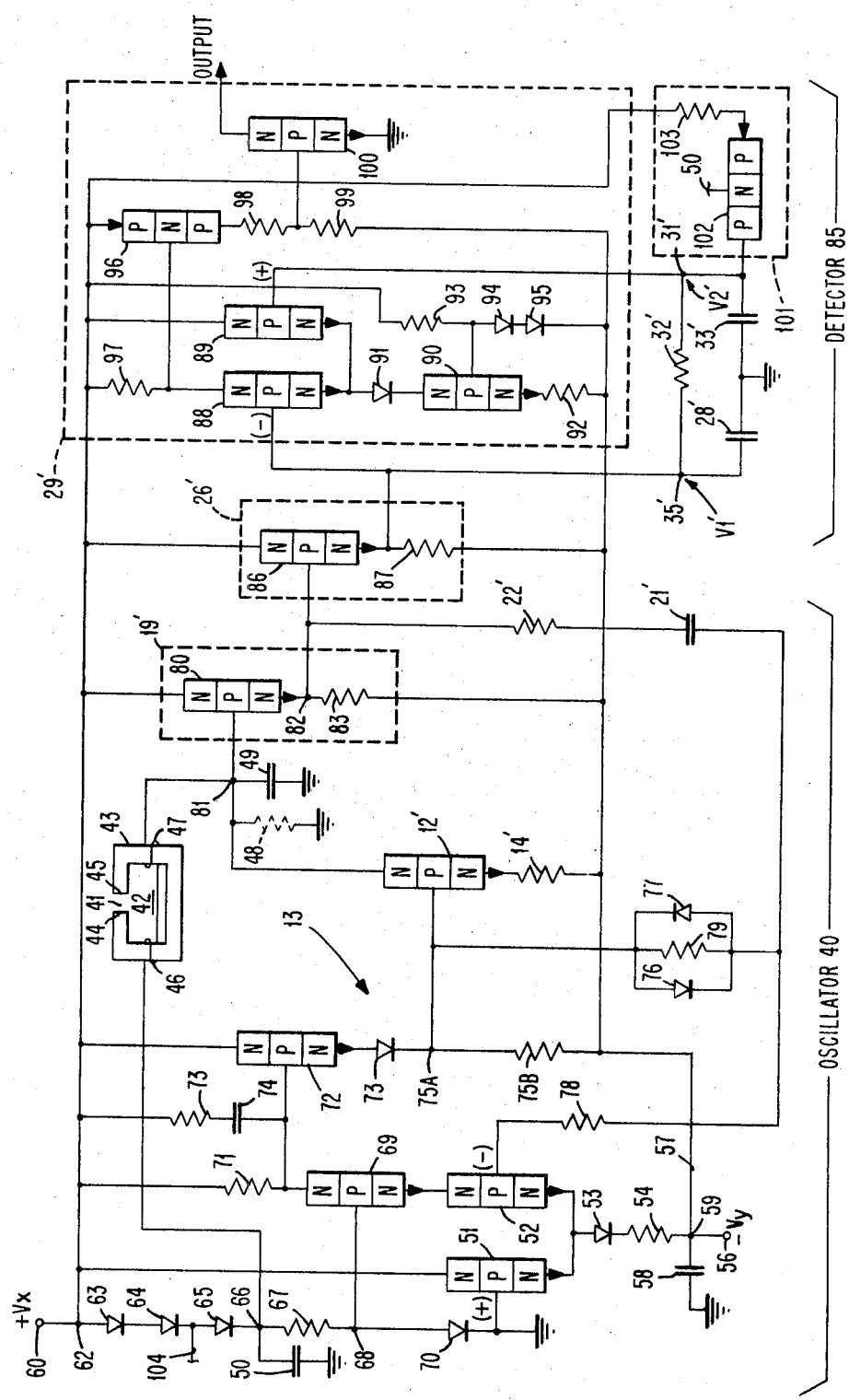
FIG. 3 is a detailed schematic diagram of still another embodiment of the invention.

Referring now to FIG. 3, there is shown another embodiment of the present invention. It has an oscillator generally indicated by the reference numeral 40. As in the previous embodiment, the moving type elements, not shown, passed through the gap 41 of an inductor 42. Inductor 42 has a generally C-shaped core 43 with pole faces 44, 45 that define the gap 41. A pair of windings 46, 47 are wound on the legs of core 43 in a series aiding relationship. The effective resistance 48 of inductor 42 is shown in dash line form for sake of clarity. Inductor 42 forms a parallel tank circuit with the grounded capacitor 49. In this regard, windings 46, 47 of inductor 42 are a.c. coupled to ground via a.c. coupling capacitor 50.

An NPN current source amplifier 12' drives the tank circuit 42–49 which is connected to its collector. The emitter of amplifier 12' is connected to bias resistor 14'.

A pair of NPN transistors 51, 52 are configured as a differential pair in the input stage of the gain and limiting amplifier generally indicated by the reference numeral 13'. As such, the respective bases of transistors 51 and 52 act as the noninverting and inverting inputs, respectively, of the differential amplifier. The emitters of transistors 51, 52 are commonly connected to a biasing network shown as series connected diode 53 and resistor 54. A negative power supply, not shown, is connected to the terminal 56 and provides an appropriate negative voltage −Vy. The last-mentioned power supply provides via conductor 57 an appropriate bias voltage to other points in the circuit of FIG. 3, as hereinafter described. De-coupling capacitor 58 provides a.c. signal de-coupling to ground at node 59. In a particular hybrid circuit module used to implement the differential amplifier of oscillator 40, diode 53 was present. It should be understood, however, that the use of diode 53 is optional and may be obviated if the differential amplifier is implemented by other circuit types.

A positive power supply, not shown, is connected to the terminal 60 and provides a positive voltage +Vx. It provides a bias voltage at node 62 which is distributed to various points in the circuit of FIG. 3, as hereinafter described. A diode voltage divider network of three series connected diodes 63, 64, and 65 are connected across the nodes 62 and 66. Network 63–65 in conjunction with the resistor 67 and grounded diode 70 provides a voltage at node 68 which is applied to the base of transistor 69. The base of transistor 51 is grounded. The emitter of transistor 69 is connected to the collector of transistor 52. The collector of transistor 51 is biased by the voltage at node 62, whereas the collector of transistor 69 is connected to the node 62 via a suitable bias resistor 71. The collector output of transistor 69 is connected to the base of transistor 72 which is configured as an emitter follower. Series connected resistor 73 and capacitor 74, which are connected between node 62 and the base input of transistor 72, frequency stabilize amplifier 13 in a manner familiar to those skilled in the art. Transistor 72 has its collector connected to node 62.

Transistor 69 provides improved response for amplifier 13'. Transistor 72 in coaction with diode 75 optimizes the operation of transistor 12' in the linear range. The emitter of NPN transistor 72 is connected via diode 75 and node 75A to parallel connected back-to-back diodes 76, 77. Resistor 75B acts as a bias for transistor 72. The diodes 76, 77 are connected to the inverted input of the differential amplifier pair 51, 52 via resistor 78. A feedback resistor 79 is connected in parallel with the feedback diodes 76, 77. Diodes 76 and 77 limit the loop gain of oscillator 40 in a manner similar to the way diodes 17 and 18 limit the gain of oscillator 20 of FIG. 1.

In the embodiment of FIG. 3, the buffer amplifier 19' provided in the feedback path of oscillator 40 is configured as an NPN emitter follower. As such, amplifier 19' has the base of its transistor 80 connected to the node 81 of tank circuit 42–49. The collector of transistor 80 is connected to node 62.

An output is taken from oscillator 40 at node 82 which connects the junction of the emitter of transistor 80 and the bias resistor 83. The output signal at node 82 is fed back to the inverted input of transistor 52 via resistor 22', capacitor 21', and resistor 78.

In the embodiment of FIG. 3, the peak follower stage 26' is configured as an emitter follower. As such, the base of NPN transistor 86 is connected to node 82. Its output is connected to an input of comparator 29' and to the node 35'. It provides the extracted envelope signal V1'. The collector of transistor 86 is connected to node 62. Its emitter is bias connected to node 59 via an appropriate bias resistor 87 connected in the emitter circuit for this purpose.

Comparator 29' includes NPN transistors 88 and 89 which are configured as a differential pair. The base of transistor 88 is the inverted input and the base of transistor 89 is the noninverted input. The emitters of transistor 88, 89 are commonly connected to a current source 90 via diode 91. Current source 90 is an NPN transistor and has transistors 88, 89 in its collector circuit. The emitter of transistor 90 is connected to the node 59 via resistor 92. The base of transistor 90 is biased across node 62 and node 59 via the biasing network which includes resistor 93 and series connected diodes 94, 95. PNP transistor 96 is connected to the collector of transistor 88. The emitter of transistor 96 is connected to node 62 and its base is connected via resistor 97 to the same node. The collector of transistor 96 is connected to the voltage dividing network resistors 98, 99 to node 59. Transistor 96 in coaction with resistors 98, 99 provides appropriate control levels for switching output transistor 100 to ON or OFF conditions. Comparator 29' includes in its output an NPN emitter grounded transistor switch 100. The base electrode of transistor 100 is connected to the junction of resistors 98, 99. Output of comparator 29' is taken from the collector of transistor 100.

Node 35 is connected to the grounded capacitor 28', which is part of the peak detector circuit 26'. Resistor 32' is connected across the nodes 35' and 31' and together with the capacitor 33' forms an RC integrating circuit. Current source 101 is connected to the node 31' and provides a reference voltage V2'−V1' across nodes 31' and 35'. Source 101 is configured as a PNP transistor 102, the collector output of which is connected to the aforesaid node 31'. The emitter of transistor 102 is connected via resistor 103 to the node 62 and its base is connected via conductor 50 to node 104 in diode network 63–65.

The principles of operation of the embodiment of FIG. 3 is similar to the embodiment of FIG. 1, and hence for sake of brevity are omitted.

Implementation of differential amplifiers 13, 19, 26 and 29 of FIG. 1 may be accomplished using conventional circuitry in a manner well known to those skilled in the art. If desired, amplifiers 13 and 29 of FIG. 1 may also be configured in a manner similar to their respective counterparts 13' and 29' shown in detail in FIG. 3.

Typical components that may be utilized in the circuit apparatus of FIG. 3 are indicated in Table I, as follows:

TABLE I

| Transistors: | |
|---|---|
| NPNs 12', 69, 72, 80, 86, 90, 100 | Fairchild Type FT1312, each |
| NPNs 51, 52, 88, 89 | Texas Instrument Type 2N2639 each |
| PNPs 96, 102 | Texas Instrument Type 2N2411, each |
| DIODES 53, 63, 64, 65, 70, 75, 76, 77, 91, 94, 95 | Fairchild Type FD7, each |
| Resistors 14', 22', 54, 75B, 83 | 1,000 ohms, each |
| Resistors 32', 98 | 2,000 ohms, each |
| Resistor 67, 73 | 510 ohms, each |
| Resistor 71 | 560 ohms |
| Resistor 78 | 1,800 ohms |
| Resistor 79 | 6,200 ohms |
| Resistor 87 | 22,000 ohms |
| Resistor 92 | 390 ohms |
| Resistor 93 | 3,900 ohms |
| Resistor 97 | 750 ohms |
| Resistor 99 | 10,000 ohms |
| Resistor 103 | 5,100 ohms |
| Capacitor 21' | 0.1 $\mu$f |
| Capacitor 28' | 0.56 $\mu$f |
| Capacitors 33', 50, 58 | 6.8 $\mu$f, each |
| Capacitor 49 | 910 pf |
| Capacitor 74 | 30 pf |
| Vx | +6 volts d.c. |
| Vy | −3 volts d.c. |

For the component values of Table I, a typical tank circuit 42–49 has a tuned frequency range of approximately 1.629 megahertz to 1.608 megahertz corresponding to all the type elements being present and passing through the inductor gap and to zero or no type elements, respectively. The bandwidth was approximately 0.200 megahertz. Typical parameters of the inductor 42 are as follows: twenty turns for each winding 46, 47 which may be of No. 38 AWG or No. 40 AWG, for example; a gap spacing between pole faces 44 and 45 of 0.125 inches; a core composition of a ferrite material with a low resistivity at the desired resonant frequency; and a core cross sectional area of 0.00375 square inches.

By judiciously selecting a narrow bandwidth for the oscillator frequency and/or the geometry of the core, the system of the invention is relatively imperious to external stimulation caused by stray magnetic fields.

Figure 4:
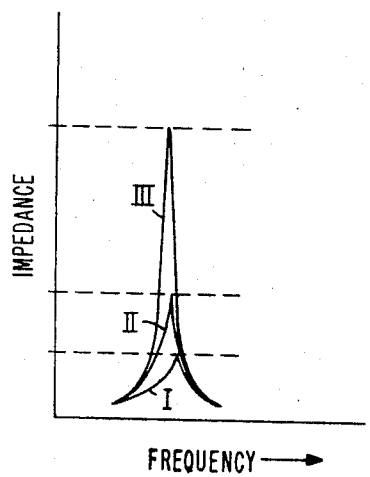
FIG. 4 is an idealized waveform diagram of the frequency response of a typical tank circuit for different conditions with respect to the presence of type elements in the inductor gap of the tank circuit under static conditions.

Referring to FIG. 4, there is shown the frequency response of a typical tank circuit for the conditions of (I) all type elements present, (II) one type element missing, and (III) no type elements present relative to the inductor gap and under static conditions, i.e. the type elements are stationary. Referring to waveform I, with all the type elements present, i.e. aforementioned condition (I), the tank impedance measured was 0.96 kilohms at a tuned tank frequency of 1.629 megahertz. For a fixed tank capacitance of 1,000 picafarads, the computed tank inductance was 9.55 microhenries. As such, i.e. under tuned conditions, the real part of the tank impedance, which is substantially the effective parallel resistance of the tank inductor, is approximately the 0.96 kilohms.

For the same tank capacitance, where one type element was missing and the void created thereby was present in the inductor gap, the tank impedance measured 2.72 kilohms at a tuned tank frequency of 1.608 megahertz, c.f. waveform (II). Under this condition, i.e. condition (II), the inductance calculated was 9.8 microhenries, and the effective parallel resistance of the tank inductor was approximately the 2.72 kilohms.

Again for the same tank capacitance, and for condition (III) with all the type elements removed, the tank impedance and hence effective parallel resistance of the tank inductor measured 4.4 kilohms at a tuned tank frequency of 1.608 megahertz, c.f. waveform III. The calculated inductance was 9.8 microhenries.

Thus, the waveforms I, II, III indicate that the effective resistance of the inductor increases as the amount of missing type elements increases, whereas the inductance and resonant frequency remain substantially constant. As the number of missing type elements increases, the eddy currents induced in the remaining type elements decrease as previously explained. Accordingly, the effective resistance of the inductor is inversely proportional to the change in eddy current in the remaining type elements.

One possible theory of explanation for the change in the effective resistance of the inductor vis-a-vis the change in the induced eddy current in the remaining type elements can be explained by the following described mathematical relationships.

More specifically, the publication "The Electromagnetic Field In Its Engineering Aspects", G. W. Carter, 2nd Edition, 1967, American Elsevier Publishing Company, Inc., page 247 gives the magnetic flux density phasor relationship B of a block material located in an alternating magnetic field as follows:

$$B = B_0 e^{-x(1+j)/d \sqrt{2}} \qquad (1)$$

where $B_0$ = flux density at the surface of the block.

$x$ = the distance along the $x$ axis of an $x$–$y$ coordinate system, the origin of which system is located at the surface of the block, and $d$ = is the effective depth of which the material of the block is penetrated by the flux of the magnetic field.

Furthermore, at page 245 of the aforesaid publication, the effective depth $d$ is given as follows:

$$d = \sqrt{\rho/\mu\omega} \qquad (2)$$

where:

$\rho$ is the resistivity of the block, $\omega$ is the frequency of the alternating field, and $\mu$ is the permeability of the block.

The flux linkage $N\phi$ associated with an inductor creating the flux density $B_0$ is as follows:

$$N\phi = LI = NB_0 A \qquad (3)$$

where $A$ = cross section of the inductor core, $N$ = the number of turns of the inductor winding, $L$ = the inductance of the inductor without any material in the gap, and $I$ = current in the inductor.

With the block material in the gap of the inductor, the voltage v across it is as follows:

$$v = -j\omega BAN \quad (4)$$

Substituting and transposing equations (1), (3) and (4), provides the relationship:

$$v = -j\omega LIe^{-x(1+j)/d} \sqrt{2} \quad (5)$$

Transposing the current term I in equation (5) results in $$Zeff = v/I = j\omega Le^{-x(1+j)/d} \sqrt{2} \quad (6)$$

where Zeff is the effective impedance of the inductor with the block of material in the gap. The impedance Zeff can be expressed as a parallel LR circuit with the following relationships:

$$Leff = Le^{-x/d} \sqrt{2} \cos x/d \sqrt{2} \quad (7)$$
$$Reff = \omega Le^{-x/d} \sqrt{2} \sin x/d \sqrt{2} \quad (8)$$

Accordingly, for the condition of an approximately constant $\omega$, increasing $\mu$, and decreasing $\rho$, such as is the case of material in the gap, then $d$ decreases, the sine term of equation (8) increases, the exponential term decreases and Reff decreases. On the other hand, for the same condition, the cosine term of equation (7) decreases while the exponential term is decreasing so that the net change in Leff is negligible. As more and more material is missing in the gap, Reff increases but changes in Leff still remain negligible.

It should be understood that the type elements are made of a conductive material suitable for having eddy currents induced into it, e.g. steel or the like. Moreover, while the embodiments have been described with certain circuit implementations, configurations, and the like, or with transistors of certain and mixed conductivity types, it should be readily understood that the invention may be practiced with other circuit implementations, configurations, and/or, with appropriate changes in the voltage polarities, transistors of opposite and/or the same conductivity types as is obvious to those skilled in the art.

Thus, while the invention has been particularly shown and described with reference to preferred embodiments, it will be understood by those skilled in the art that the foregoing and other changes in form and detail may be made therein without departing from the spirit and scope of the invention.

We claim:

1. In a moving type printer having a train of type elements moving in a predetermined path, missing type detector circuit apparatus comprising:
   oscillator circuit means having
      tank circuit means, and
      inductor means included in said tank circuit means, said inductor means having a gap through which said train of moving type elements pass, and said inductor means providing a magnetic field across said gap for inducting eddy currents in said moving type elements; and
   output signal means providing an output signal in response to changes in the effective resistance of said inductor means caused by the changes in said inducted eddy currents whenever at least a predetermined portion of at least one of said type elements is missing.

2. Detector circuit apparatus according to claim 1 wherein said output signal means further comprises:
   comparator means having first and second input means and first output means for providing said output signal,
   peak detector means having third input means and second output means, said second output means being coupled to said first input means,
   means for coupling said third input means of said peak detector means to said tank circuit means, and
   reference signal means coupled to said second input means for providing a threshold reference signal thereat, said comparator means providing said output signal at said first output means whenever the peak follower's output signal at said second output means is greater than the threshold reference signal.

3. Detector circuit apparatus according to claim 1 wherein said oscillator circuit means further comprises:
   an amplifier having input and output means associated therewith, and
   positive feedback means coupled between said input and output means, said positive feedback means comprising said tank circuit means.

4. Detector circuit apparatus according to claim 3 wherein said feedback means further comprises:
   a current amplifier for driving said tank circuit means, said current amplifier having control input means coupled to said output means,
   a feedback impedance network, and
   coupling means for coupling said feedback impedance network between said input means and said output means.

5. Detector circuit apparatus according to claim 4 wherein said coupling means further comprises buffer circuit means coupled between said tank circuit means and said feedback impedance network, said output signal means being coupled to said buffer circuit means.

6. Detector circuit apparatus according to claim 5 wherein said output signal means further comprises:
   comparator means having second and third input means and second output means for providing said output signal,
   peak detector means having fourth input means and third output means, said third output means being coupled to said second input means, said fourth input means being coupled to said buffer circuit means to effectuate the aforementioned coupling of said output signal means thereat, and
   reference signal means coupled to said third input means for providing a threshold reference signal thereat, said comparator means providing said output signal at said second output means whenever the peak follower's output signal at said third output means is greater than the threshold reference signal.

7. Detector circuit apparatus according to claim 1 when said oscillator circuit means is of the narrow-band type.

* * * * *